UNITED STATES PATENT OFFICE.

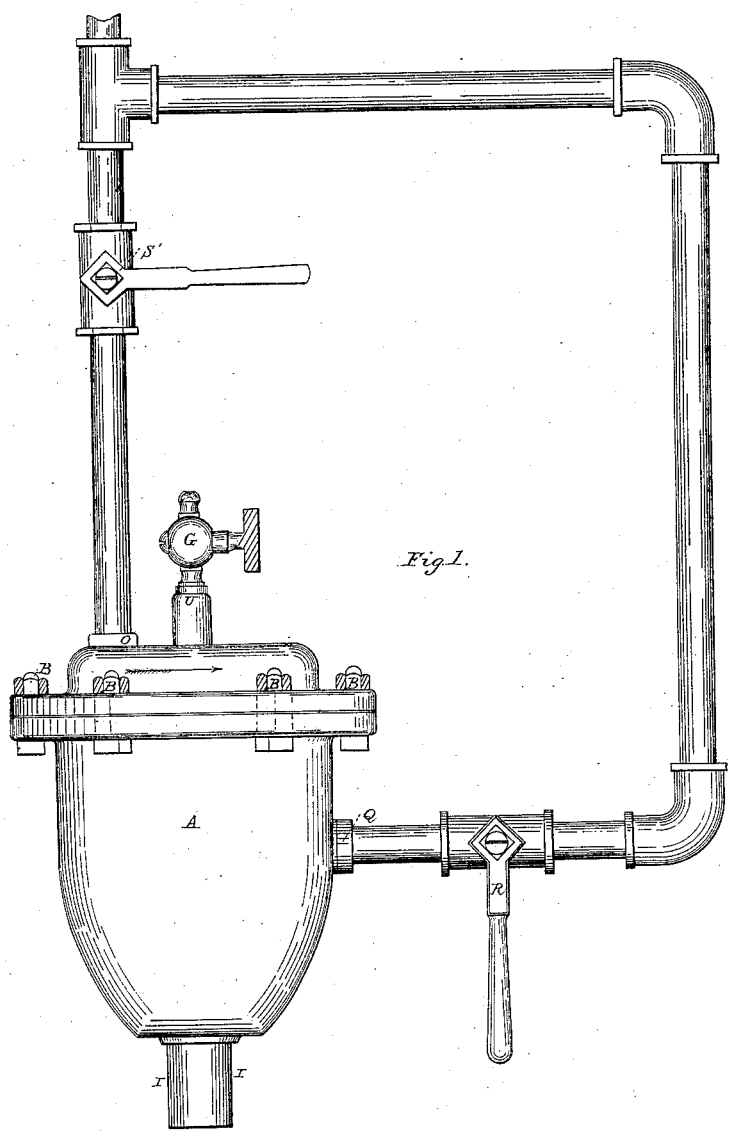

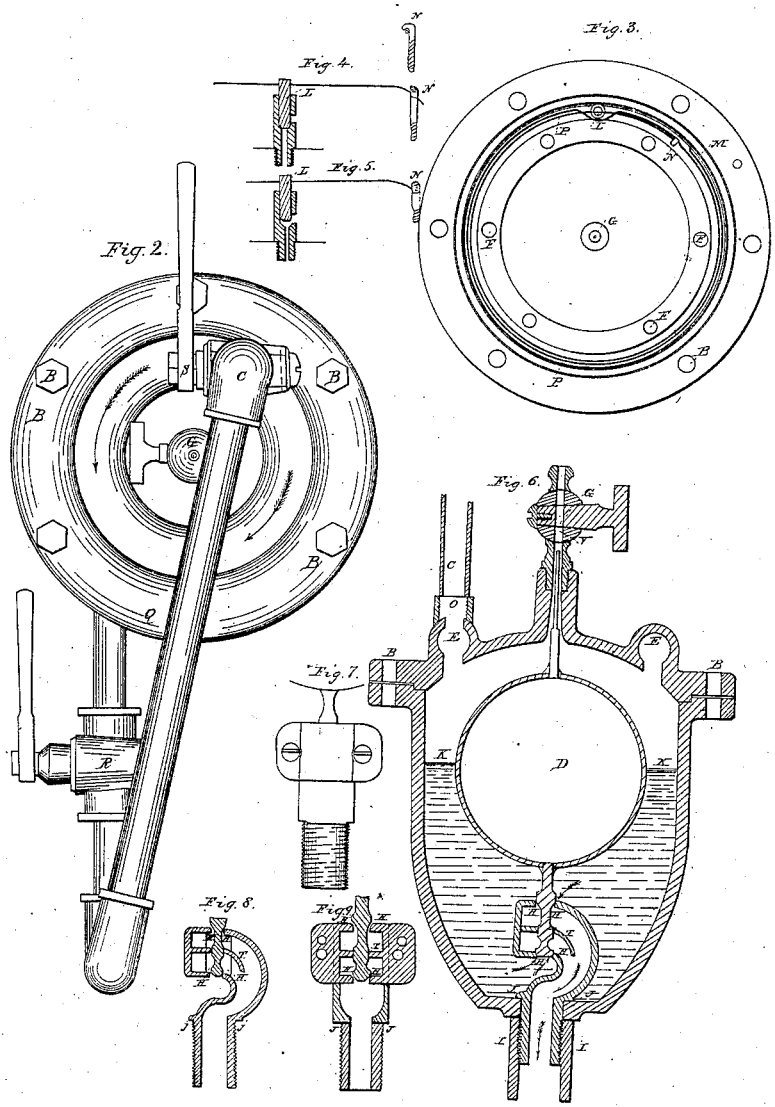

ABRAM BRIGHAM, OF LAWRENCE, MASSACHUSETTS.

IMPROVED PIPE-DRAINER.

Specification forming part of Letters Patent No. 38,371, dated May 5, 1863.

*To all whom it may concern:*

Be it known that I, ABRAM BRIGHAM, of Lawrence, in the county of Essex and Commonwealth of Massachusetts, have invented an Improved Rotary Pipe-Drainer; and I do hereby declare that the following is a full, clear, and exact description of the construction and operation of the same, reference being had to the annexed drawings, making a part of this specification, in which—

Figure 1 represents the side view of drainer with pipes attached, as if in operation. Fig. 2 represents a vertical view, as looking down on top of drainer and pipes. Fig. 3 represents the cover of the drainer inverted, showholes F, for condensed steam, &c., to pass into drainer, and also shows wire P, used to open and close small air-valve in cover. Fig. 4 represents small air-valve shut. Fig. 5 represents small air-valve open. Fig. 6 represents interior section of drainer. Fig. 7 represents a small box placed inside of drainer, and contains the valve-seats. Figs. 8 and 9 represent sections of said small box.

I first construct a box, A, Fig. 1, with a cover, Fig. 3, fitted steam tight to the box and firmly fastened by the bolts B. Said cover is made hollow, as see E, Fig. 6, in the form of a circular tube extending entirely around the cover, as see arrows in Figs. 1 and 2. On the under side of this cover are holes made, (see F, Fig. 3,) which open into the hollow place or circular tube, and serve to distribute equally over the whole upper surface of the drainer, the circular tube preventing the steam from acting directly on the float or ball D inside, and can only find its way through these holes into the drainer—that is to say, the steam, condensed steam, vapor, and water enter the cover through O into the circular tube, and, passing around the tube, fall into the drainer through the holes F. In the center of the cover there is a tube with stop G, and is used to test the working of the machine.

L in the cover is a small air-valve, which is used to let the air pass out as the steam comes in. Said valve is always open when the drainer is not in use, or when the drainer is cold, but is closed by the expansion of the wire P as soon as the air passes out. The wire is expanded by the heat, and closes the valve steam-tight. The valve is seen open in Fig. 5, and closed in Fig. 4. The wire being fastened to the under side of the cover at M, Fig. 3, it passes around the under side of the cover nearly twice before it passes through the eye of the valve, so as to have ample length for expansion, and after passing through the valve L it passes under the hook M, the end of wire being bent near said hook, so that when the wire expands in length the curve of the wire will be pushed under the hook N to the higher part of the curve, and thus close the valve L without any care on the part of the operator. At the lower part of the drainer there is an opening, which receives the small valve-seat box, Fig. 7, which is fitted at the shoulder J, so as to be water-tight, lower down and on outside of drainer.

I is a pipe screwed onto the lower end of the valve-seat box, to carry to any place desired the condensed steam or water. In the upper part of this small box are valve-seats at H H, ground so as to receive the valves at lower end of the stem attached to the float or ball D, and water-tight.

T is a partition between the valve-seats H, and serves to steady the ball when raised, and also to prevent the two streams of water which come in from above and below (see arrows at H) from coming in contact with each other and obstructing the flow. This valve-seat box is made in two parts, and is screwed together, as in Fig. 7.

The section in Figs. 8 and 9 represents the valve opened, while in Fig. 6 it is represented shut.

On the top of the ball or float there is a stem attached, which passes up into the tube U and serves merely to steady the float D. Said stem is made to work loosely in the tube U, so that when the stop G is turned the stem may pass out, and also to rise or fall readily with the float or ball.

Now, at the end of a circuit of pipe after the steam has been used at a convenient place below the pipe, I place my drainer by screwing the steam-pipe C to the top of the drainer at O. The steam, condensed steam, water, &c., will enter the hollow circular tube E in the cover, and, passing around the circle, will pass through the holes F into the drainer and occupy the space above the water-line K. The steam in passing in will force out the air through the valve L, and, when out, the valve will close by the expansion of the wire P, Fig. 3. The water in the drainer is always at K, or exactly at a point where it will cease to bear up the ball D. Now, when the condensed steam or water falls into the water K and raises it, the ball will rise, and with it the valves H H, when the water will enter the small box at H H and pass off in the direction of the arrows, and so the process will continue. As often as the water is raised above K, so often will the valves be opened, and the surplus will pass off without the escape of any steam. If dirt or anything gets into the drainer and obstructs its operation, I close the steam-pipe at S and let the steam on in force at Q, (see Fig. 2,) where the pipe enters on one side of the drainer, and which, giving a whirling motion, will clean the drainer of all sediment.

I claim—

1. The cover of the box A, made hollow in the form of a circular tube or pipe, with the under side perforated in order to distribute the condensed steam equally when it enters the drainer, in combination with wire P and air-valve L, substantially as described.

2. The making the valve-seats with partition T between them, for the purpose herein set forth.

ABRAM BRIGHAM. [L S.]

Witnesses:
E. D. HAYES,
JAMES K. BARKER.